US008991929B2

(12) United States Patent
Doucette et al.

(10) Patent No.: US 8,991,929 B2
(45) Date of Patent: Mar. 31, 2015

(54) STROLLER SEAT WITH ARTICULATING CALF SUPPORT

(71) Applicants: Louis Doucette, Acworth, GA (US); Shelley Palazzolo, Atlanta, GA (US); Thomas J Pollack, Atlanta, GA (US); Brady Matthew Schroeder, Milton, GA (US)

(72) Inventors: Louis Doucette, Acworth, GA (US); Shelley Palazzolo, Atlanta, GA (US); Thomas J Pollack, Atlanta, GA (US); Brady Matthew Schroeder, Milton, GA (US)

(73) Assignee: Graco Children's Products Inc., Atlanta, GA (US)

( * ) Notice: Subject to any disclaimer, the term of this patent is extended or adjusted under 35 U.S.C. 154(b) by 0 days.

(21) Appl. No.: 13/875,271

(22) Filed: May 1, 2013

(65) Prior Publication Data
US 2013/0292987 A1 Nov. 7, 2013

Related U.S. Application Data

(60) Provisional application No. 61/640,730, filed on May 1, 2012.

(51) Int. Cl.
*A47C 7/50* (2006.01)
*A47C 20/00* (2006.01)
*B62B 5/08* (2006.01)
*B62B 7/12* (2006.01)
*B62B 9/10* (2006.01)

(52) U.S. Cl.
CPC ............... *B62B 5/082* (2013.01); *B62B 7/123* (2013.01); *B62B 9/102* (2013.01); *B62B 9/104* (2013.01)
USPC ................................. 297/423.3; 297/423.26

(58) Field of Classification Search
USPC ............... 297/423.3, 16.2, 423.26, 423.29, 297/423.35; 280/642
See application file for complete search history.

(56) References Cited

U.S. PATENT DOCUMENTS

| 6,896,326 B2* | 5/2005 | Chen | 297/256.13 |
| 8,430,456 B2* | 4/2013 | Nowak et al. | 297/423.3 |
| 8,523,218 B2* | 9/2013 | Doucette et al. | 280/642 |
| 2011/0240797 A1* | 10/2011 | Behe | 244/122 R |
| 2012/0032418 A1* | 2/2012 | Doucette et al. | 280/642 |
| 2012/0032490 A1* | 2/2012 | Nowak et al. | 297/423.3 |

* cited by examiner

Primary Examiner — Chi Q Nguyen
(74) Attorney, Agent, or Firm — Lempia Summerfield Katz LLC

(57) ABSTRACT

A stroller seat has a seat bottom with a calf support pivotally connected thereto and pivotable between a lowered position and a raised position. A positioning mechanism is coupled to the calf support and movable between an engaged arrangement and a released arrangement. The positioning mechanism, when in the engaged arrangement, retains the calf support in a position selectable from among at least the lowered position and raised position. A release actuator on the calf support is coupled to the positioning mechanism. The release actuator moves the positioning mechanism to the released arrangement. The positioning mechanism, whether in the engaged or released arrangement, allows the calf support to move in the direction of the raised position. The positioning mechanism, when in the engaged arrangement, prevents the calf support being moved in the direction of the lowered position. The positioning mechanism, when in the released arrangement, permits the calf support to move toward the lowered position.

20 Claims, 13 Drawing Sheets

STROLLER SEAT WITH ARTICULATING CALF SUPPORT

RELATED APPLICATION DATA

This patent is related to and claims priority benefit of U.S. Provisional Application No. 61/640,730 filed May 1, 2013 and entitled "Stroller with Articulating Calf Support." The entire content of this prior filed provisional application is hereby incorporated herein by reference.

BACKGROUND

1. Field of the Disclosure

The present invention is generally directed to stroller seats, and more particularly to a stroller seat with an adjustable or articulating calf support.

2. Description of Related Art

Strollers and similar products are known in the art for transporting children. Most of these devices provide a seating area that is configured to hold and support a child during use of the stroller. Many of these known products employ a child seat that has only one non-adjustable seating configuration for the child. In addition, many of these types of products are not suited to allow different age-dependent seating arrangements for an infant or a child occupant as they grow.

Some strollers offer seat configurations that can accommodate various sized/aged children from newborns to toddlers. Some strollers only accommodate infants, and others only accommodate older children. Strollers that accommodate newborns can have a seat that can be positioned in a "lie flat" configuration. Strollers that accommodate older children can have an upright seating configuration. Positions between upright and lie flat can be achieved in some strollers by reclining a seat back to varying angles. In a lie flat configuration, it is desirable to encompass the envelope of the flat seat back and seat bottom with "walls" for a child's safety and security. One part of the wall can be formed by a head pan of the stroller seat, which is attached to a top end of the seat back.

The Chicco Cortina model stroller accomplishes moving a head pan on the stroller seat from an upright position to a flat position by using complex mechanical linkages to drive the head pan up to a 90° angle relative to the seat back in order to create such a wall with the seat lying flat. The Graco Andale model stroller also has a similar design, with plastic linkages and webbing. The mechanical linkages can require many plastic components. As a result, such mechanical linkages embody numerous components, which can be expensive to manufacture and assemble, thereby adding unnecessary cost and complexity to a stroller.

Strollers and stroller seats are also known in the art that incorporate a calf support. In many examples, the calf support is connected to a forward end of the seat bottom of the stroller seat. A typical calf support provides a rest surface between a foot rest on the stroller frame and the forward end of the seat bottom to provide comfort to the seat occupant. This type of calf support can support the feet, and calves of a smaller seat occupant, particularly where the occupant's feet cannot yet reach the foot rest.

On many strollers of this type, the calf support is adjustable between at least a raised position and a lowered position. The surface of the calf support can generally lie more elevated, parallel, or closer to parallel to the seat surface of the seat bottom in the raised position. The surface of the calf support can lie at a greater downward angle relative to the seat surface and hang or depend more downward from the seat bottom in the lowered position.

A typical calf support is retained in a selected position relative to the seat bottom by lock mechanisms on opposite sides of the seat. Each of the lock mechanisms typically has a button that must be depressed in order to release the individual mechanism. Thus, the caregiver must typically use both hands to release the lock mechanisms before being able to adjust the calf support position either up or down. With both hands occupied, it can be difficult, cumbersome, or awkward for the caregiver to then adjust the position of the calf support.

Some stroller seats employ a calf support with a wire that underlies the calf support and connects the lock mechanisms. The wire must be manipulated to release the calf support during adjustment. The wire release mechanism typically does not operate intuitively. In order to adjust the calf support to the raised position, a user must lift the calf support well beyond its intended raised position and away from the wire, locate the underlying wire, then lift the wire to set the calf support to the raised position, and drop the calf support back onto the wire. In order to lower the calf support, the user must again lift the calf support from its current position away from the wire and then push down on the wire to release the lock mechanisms. The calf support can then be repositioned to the lowered position. The release wire can be actuated using one hand, but the user must first use one hand to lift the calf support away from the sire prior to adjustment. Thus, the user must typically still use both hands to adjust the position of the calf support because one hand manipulates the wire after their other hand grabs the calf support during adjustment.

SUMMARY

According to one aspect of the disclosure, a stroller seat has a seat bottom with a forward end and a rear end. A calf support is pivotally connected to the seat bottom about a pivot axis adjacent or near the forward end and is pivotable between a lowered position and a raised position relative to the seat bottom. A positioning mechanism is coupled to the calf support and is movable between an engaged arrangement and a released arrangement. The positioning mechanism is configured, when in the engaged arrangement, to retain the calf support in a selected position selectable from among at least the lowered position and the raised position. A release actuator is provided on the calf support and is coupled to the positioning mechanism. The release actuator is configured to move the positioning mechanism to the released arrangement. The positioning mechanism is configured, whether in the engaged arrangement or the released arrangement, to allow the calf support to move from the lowered position to the raised position. The positioning mechanism is configured, when in the engaged arrangement, to prevent the calf support being moved from the raised position to the lowered position. The positioning mechanism is configured, when in the released arrangement, to permit the calf support to move from the raised position to the lowered position.

According to one aspect of the disclosure, the release actuator can be positioned near the widthwise center of the calf support.

According to one aspect of the disclosure, the release actuator can be positioned on a back side of the calf support.

According to one aspect of the disclosure, the calf support can have first and second opposed sides and can have first and second positioning mechanisms, with one on each of the first and second sides of the calf support.

According to one aspect of the disclosure, the release actuator can be positioned near the widthwise center of the calf support between two of the positioning mechanism and, when actuated, can move the first and second positioning mechanisms to the released arrangement.

According to one aspect of the disclosure, the release actuator can be a trigger positioned near a widthwise center of the calf support and can be slidable or squeezable, when actuated, from an engaged position to a released position.

According to one aspect of the disclosure, the release actuator can be slidable or squeezable, when actuated, from an engaged position to a released position, and a spring can bias the trigger toward the engaged position.

According to one aspect of the disclosure, the release actuator can be positioned near a widthwise center of the calf support and can be slidable or squeezable, when actuated, from an engaged position to a released position and a spring can bias the release actuator toward the engaged position.

According to one aspect of the disclosure, the calf support can have a free edge opposite the forward end of the seat bottom and the release actuator can be actuated by drawing the release actuator toward the free edge.

According to one aspect of the disclosure, the positioning mechanism can include a fixed ratchet gear mounted on the pivot axis. The fixed ratchet gear can have a first angled tooth forming a first ratchet notch in an edge of the fixed ratchet gear and positioned to correspond to the lowered position and can have a second angled tooth forming a second ratchet notch in the edge of the fixed ratchet gear and positioned to correspond to the raised position.

According to one aspect of the disclosure, the release mechanism can include an engagement pin that is spring biased toward an edge of a fixed ratchet gear and can seat in any of a first and a second ratchet notch that respectively correspond with the lowered and raised positions and when aligned therewith.

According to one aspect of the disclosure, the release mechanism can withdraw an engagement pin away from an edge of a fixed ratchet gear when the release mechanism is actuated.

According to one aspect of the disclosure, the calf support can include first and second opposed sides whereby the release actuator can be positioned widthwise centrally between the first and second sides on the calf support. The calf support can also include first and second positioning mechanisms with one at each of the first and second sides of the calf support. The calf support can further include an axle extending between the first and second sides and can be coupled to the first and second positioning mechanisms.

According to one aspect of the disclosure, the calf support can include first and second positioning mechanisms on opposite ends of an axle and each positioning mechanism can include a fixed ratchet gear mounted to a corresponding end of the axle. Each of the fixed ratchet gears can have a lower angled tooth forming a lower ratchet notch in an edge of the fixed ratchet gear and positioned to correspond to the lowered position. Each of the fixed ratchet gears can also have an upper angled tooth forming an upper ratchet notch in the edge of the fixed ratchet gear and positioned to correspond to the raised position.

According to one aspect of the disclosure, the release mechanism can include a rod extending widthwise across the calf support. The rod can have an engagement pin near each terminal end of the rod. The rod can be spring biased such that the pins are biased toward the edges of a respective fixed ratchet gear at each side of the calf support and can seat in any of a lower or upper ratchet notch in the edges of the fixed ratchet gears corresponding respectively to the raised and lowered positions and when aligned therewith.

According to one aspect of the disclosure, the release mechanism can withdraw engagement pin on terminal ends of a rod extending widthwise across the calf support away from the edges of fixed ratchet gears at each side of the calf support when the release mechanism is actuated.

According to one aspect of the disclosure, the calf support can be retained in one or more selectable intermediate positions between the raised position and the lowered position with the positioning mechanism in the engaged arrangement.

According to one aspect of the disclosure, the stroller seat can have a seat back, which can be reclined to a lie flat seat orientation that is generally horizontal and generally parallel with the seat bottom. The calf support, in the raised position, can be oriented generally vertically and generally perpendicular to the seat bottom in the lie flat seat orientation.

According to one aspect of the disclosure, the stroller seat can have a seat back, which can be reclined to a lie flat seat orientation that is generally horizontal and generally parallel with the seat bottom. The seat back can have an upper free end and a head rest pivotally coupled to the upper free end. The head rest can be pivoted to a raised position generally vertical and generally perpendicular to the seat back in the lie flat seat orientation.

According to one aspect of the disclosure, the stroller seat can have a seat back, which can be reclined to a lie flat seat orientation that is generally horizontal and generally parallel with the seat bottom. The calf support, in the raised position, can be oriented generally vertically and generally perpendicular to the seat bottom in the lie flat seat orientation and can be moved automatically from the lowered position to the raised position when the seat back is moved to the lie flat seat orientation.

According to one aspect of the disclosure, the stroller seat can have a seat back, which can be reclined from an upright toddler seat position to a reclined position and/or to a lie flat seat orientation that is generally horizontal and that is generally parallel with the seat bottom. The calf support can be moved automatically from the lowered position toward the raised position when the seat back is moved from the upright toddler position to the reclined position or the lie flat seat orientation.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed stroller seats and calf supports solve or improve upon one or more of the above-noted and/or other problems and disadvantages with prior known stroller seats and calf supports. In one aspect of the disclosure, the stroller seat can have a calf support that can be raised without having to actuate a release mechanism of the calf support. In one aspect of the disclosure, the stroller seat can have a calf support that is raised automatically as the seat back is reclined to a lie flat position. In one aspect of the disclosure, the seat back and seat bottom may be reconfigurable to a lie flat position with a calf support elevated to a raised position at one end. In one aspect of the disclosure, the seat back and seat bottom may be reconfigurable to a lie flat position or orientation with a calf support and a head rest or head pan both elevated to a generally vertical raised position at opposite ends of the stroller seat. In one aspect according to the disclosure, the stroller seat can have a calf support that can be raised using only one hand and released and lowered also using only one hand. In one aspect of the disclosure, the stroller seat can have a calf support and a release mechanism that can be actuated by squeezing with one hand while grasping the calf support. In one aspect of the disclosure, the disclosed stroller seat can have a calf support and employ two lock or latch mechanisms, one on each side of the calf support, each operable by one release mechanism. These and other objects, features, and advantages of the disclosed stroller seat will become apparent to those having ordinary skill in the art upon reading this disclosure.

Figure 1:
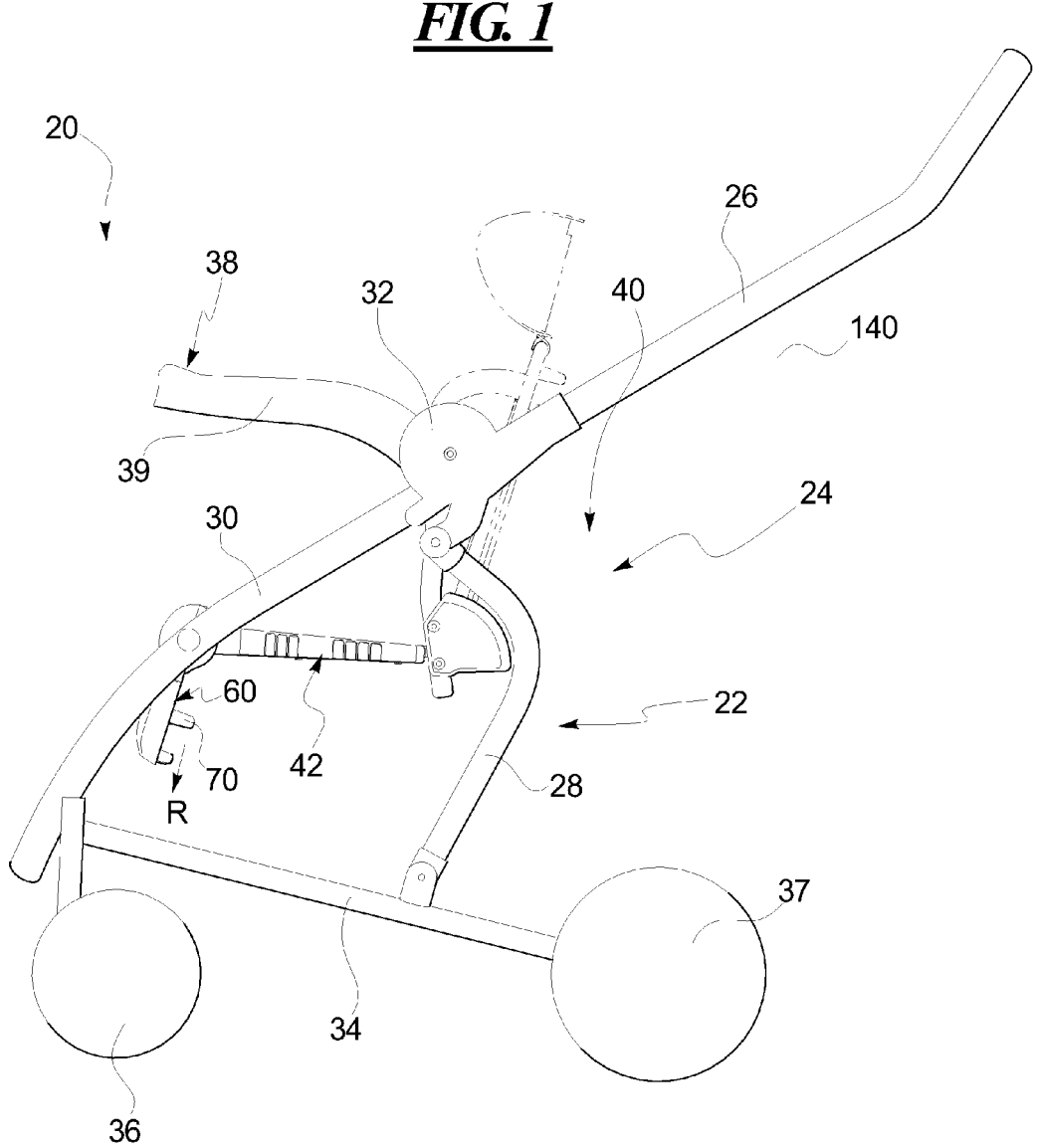
FIG. 1 shows a left side view of a stroller having one example of a stroller seat constructed in accordance with the teachings of the present disclosure.

Turning now to the drawings, FIG. 1 shows a side view of a stroller 20 that is somewhat generically depicted herein for convenience and ease of description. The stroller 20 generally has a frame assembly 22 with left and right frame sides. Only the left frame side is shown herein, as the right frame side would be substantially a mirror image of the left frame side. The frame assembly 22 carries a stroller seat 24 constructed in accordance with the teachings of the present disclosure. Further aspects and details of the stroller seat 24 are discussed below.

In the depicted example, the frame assembly 22 has a left side push bar 26 that extends upward and rearward of the stroller seat 24. A mirror image right side push bar and transverse handle bar (both not shown) form a stroller handle extending up and rearward behind the stroller seat 24 as is known in the art. The frame assembly 22 also has a left rear leg 28 and left front leg 30. A mirror image right rear leg and right front leg are provided on the right frame side though not shown herein. An upper end of the left rear leg 28 and an upper end of the left front leg 30 are pivotally connected to a left side pivot joint or fold joint 32 on the frame assembly 22. A mirror image right side pivot joint or fold joint is also provided on the right frame side, though not shown herein. A lower end of the left push bar 26 is also pivotally connected to the left fold joint 32.

A lower end of the left rear leg 28 and a lower end of the left front leg 30 are each pivotally connected to a left bottom rail 34 that extends somewhat horizontally front to back on the frame assembly 22. A mirror image right bottom rail is provided on the right frame side though also not shown herein. The left front leg 30 is connected to the front end of the left bottom rail 34. The left rear leg 28 is connected to the left bottom rail 34 spaced rearward of the left front leg 30 but forward of the rear end of the bottom rail. A left rear wheel 36 can be carried on the rear end of the left bottom rail 34. A left front wheel 37 can be connected to the left front leg 30 and the left bottom rail 34 near their respective lower and front ends. The right frame side has mirror image right front and rear wheels. The frame assembly 22 can also have a number of cross bars or cross members extending between the left and right frame sides as is also known in the art. The frame assembly 22, though not shown herein, is configured to fold up from the in-use configuration as shown in FIG. 1 to a folded configuration (not shown) as is known in the art.

In this example, the stroller 20 also has a child's tray or arm bar 38 that extends between the left and right frame sides. The stroller seat 24 is positioned behind the tray or arm bar 38 and is mounted to the frame assembly 22. As discussed in some limited detail below, the seat is reclinable as indicated in FIG. 1. The tray or arm bar 38 can be either a part of the stroller seat 24 or a part of the frame assembly 22. The tray or arm bar 38 has a pair of end segments that extend front to back on the frame assembly. These end segments can define armrests 39 at the sides of the stroller seat 24 for the seat occupant.

Other components of the stroller 20, such as the seat mounting and support parts, ancillary frame and fold joint components, fold latches and actuators, parent trays, cup holders, canopies, storage baskets, handles, soft goods, and the like are not described or depicted herein. However, the stroller 20 can comprise a wide variety of different features, parts, components, and accessories and yet fall within the spirit and scope of the present invention. As will be evident to those having ordinary skill in the art, the overall design and construction of the stroller 20 on which the seat assembly 24 is deployed can vary considerably from the examples disclosed and described herein. The configuration, shape, assembled arrangement, material composition, size, and the like of the various legs, push bars, rails, and pivot or fold joints can be dramatically changed while still being adaptable for use with the disclosed stroller seat.

Figure 2:
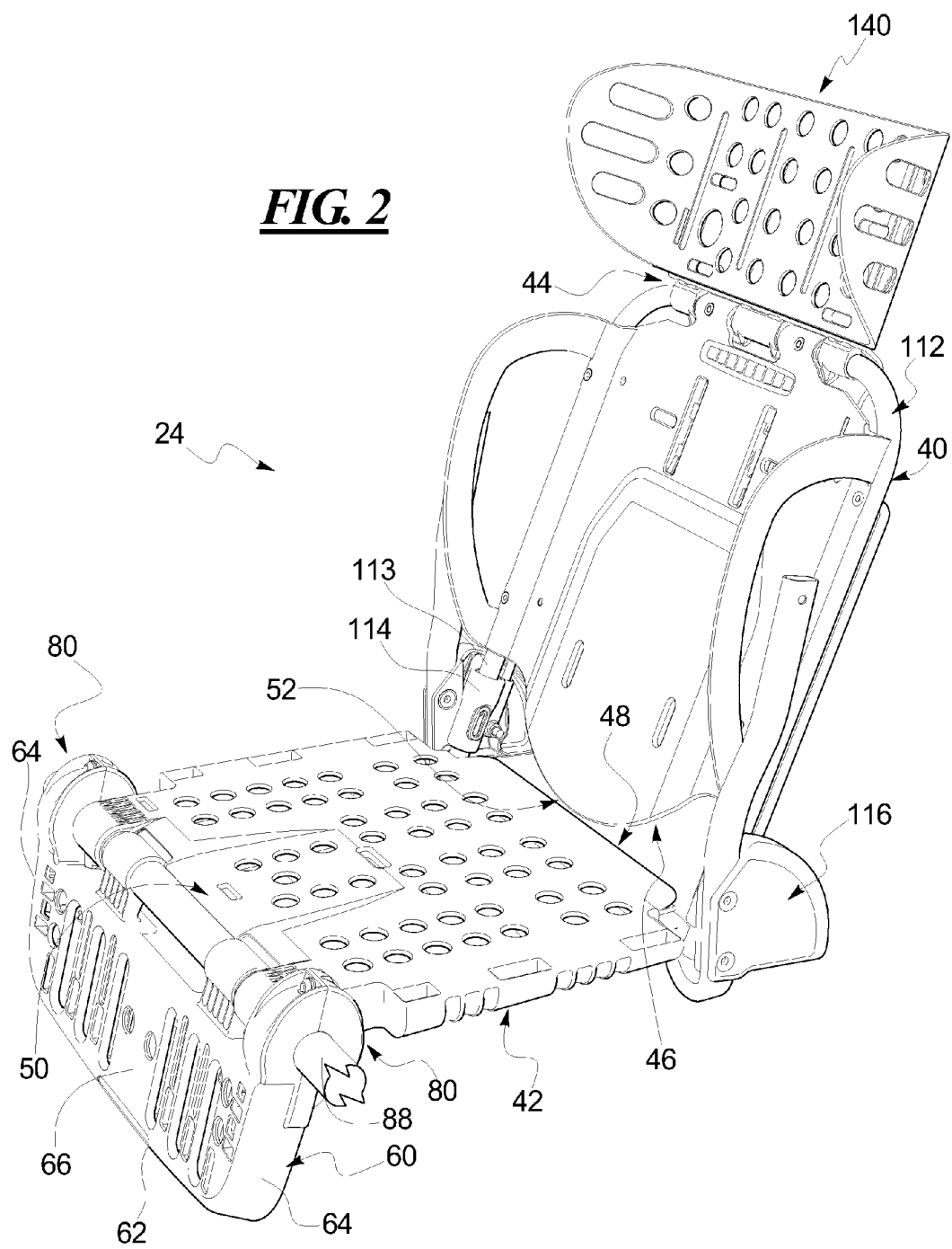
FIG. 2 shows a top, front, and left side perspective view of the stroller seat shown in FIG. 1.
Figure 3:
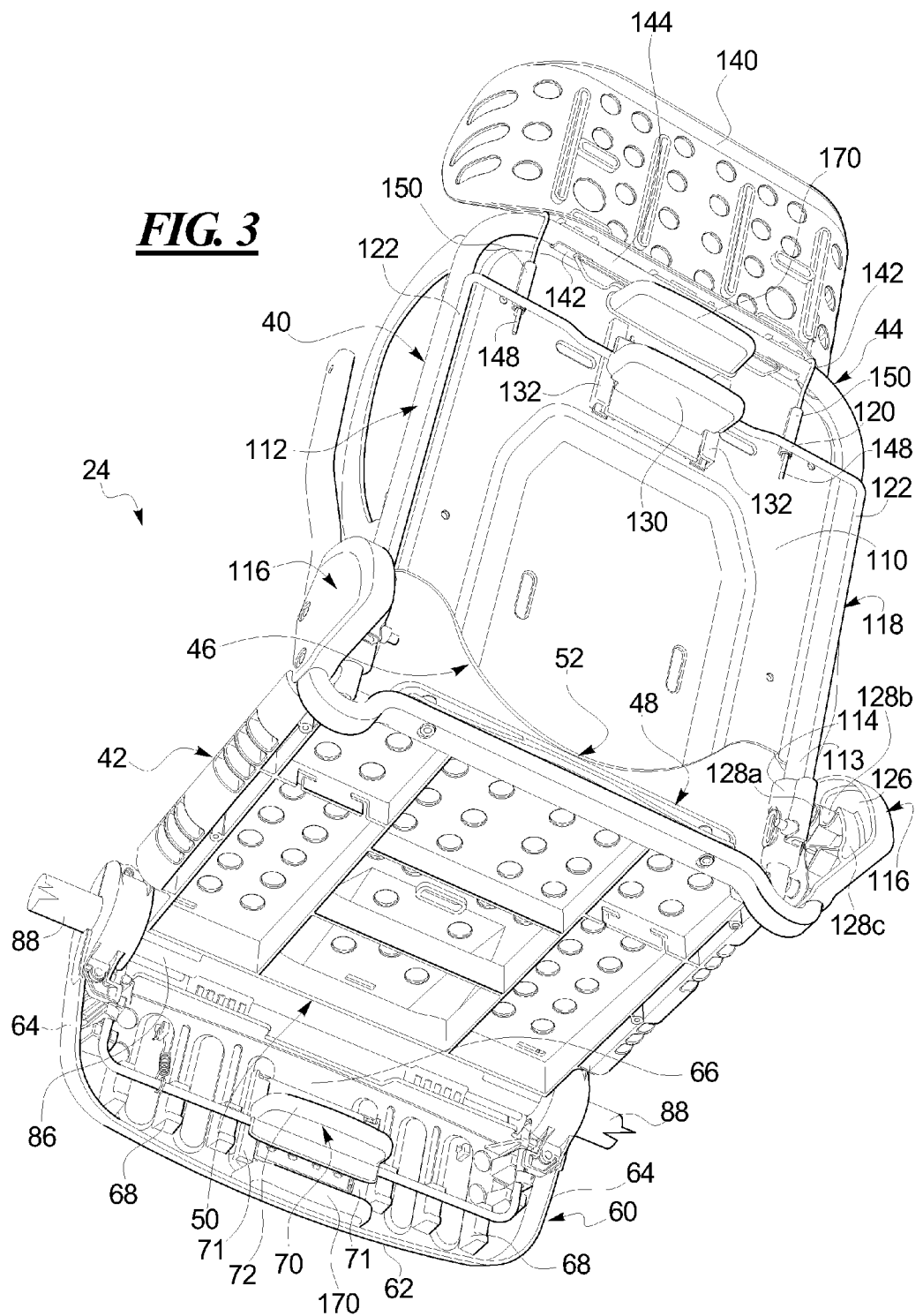
FIG. 3 shows a bottom, rear, and left side perspective view of the stroller seat shown in FIG. 2.

The stroller seat 24 is shown and described with reference to FIGS. 2-4. The stroller seat 24 is illustrated with no soft goods applied to the seat or the frame assembly 22. Instead, the stroller seat 24 and related components can be clearly seen, as they are not hidden or covered by soft goods or other stroller components. In general, the disclosed stroller seat 24 has a seat back 40 and a seat bottom 42. The seat back 40 in this example has an upper end 44 and a lower end 46 as is known in the art. Similarly, the seat bottom 42 has a rear end 48 and a forward end 50 also as is known in the art. The lower end 46 of the seat back 40 and the rear end 48 of the seat bottom 42 are located closely adjacent to one another at a seat bight region 52. With the stroller 20 in an in-use configuration of FIG. 1, the seat back 40 generally has a back support surface on its front or forward facing side. The seat bottom 42 generally has a seat surface on its top or upward facing side when the stroller 20 is in an in-use configuration. As with the overall stroller 20, the configuration, size, shape, material composition, and construction of the basic components of the stroller seat 24 can vary considerably and yet fall within the spirit and scope of the present invention.

In the disclosed example, the stroller seat 24 has a calf support 60 as shown in FIGS. 1-4. The calf support 60 is located adjacent to the forward end 50 of the seat bottom 42. The calf support 60 generally has a rear edge pivotally coupled to the forward end 50 of the seat bottom 42 in this example and has an opposite free edge 62. The calf support 60 has a pair of side edges or sides 64. The calf support 60 in this example is a molded component formed of a polymer, i.e., a plastic material and has a panel 66 between the rear edge, the free edge 62, and the opposed sides 64. The panel 66 has a molded support structure 68 on the back side of the panel. A front side of the calf support is relatively flat or smooth so that a child's legs may be comfortably supported by the calf support 60 during use. As will be evident to those having ordinary skill in the art upon reading this disclosure, the calf support 60 can take on other shapes, configurations, and constructions, can be made from materials other than polymers, and/or can be made of a number of discrete assembled components.

The calf support 60 generally has a release actuator 70 positioned on a part of the calf support. In this example, the release actuator 70 is positioned on the back side of the panel 66 on the calf support 60. The release actuator 70 is captured between slide tracks 71 on the back side of the panel 66. A grip portion 72 of the release actuator is positioned widthwise near the center of the calf support 60 between the sides 64. The release actuator 70 can be actuated in the direction of the arrow R (see FIG. 1), as described in greater detail below, in order to release the calf support 60 as needed to permit adjusting the position of the calf support. The calf support 60 is shown in FIGS. 1-3 in a lowered and possibly in a lowermost position. This position is suitable for a toddler seated in the stroller seat 24 with the seat back 40 in an upright or toddler seating position, as shown in phantom in FIG. 1. The toddler's legs and calves will lie against the calf support 60 while they are seated in the stroller seat 24. The calf support 60 in this example is adjustable or can be articulated among the lowered position, at least one intermediate position, and a raised position. In other examples, the calf support 60 may only be adjustable between a raised position and lowered position or among more than one intermediate positions therebetween. As also described below, the calf support 60 in this example can be configured so that it can be lifted in the direction of the raised position without having to actuate the release actuator 70 but can only be lowered upon actuation of the release actuator.

Figure 4:
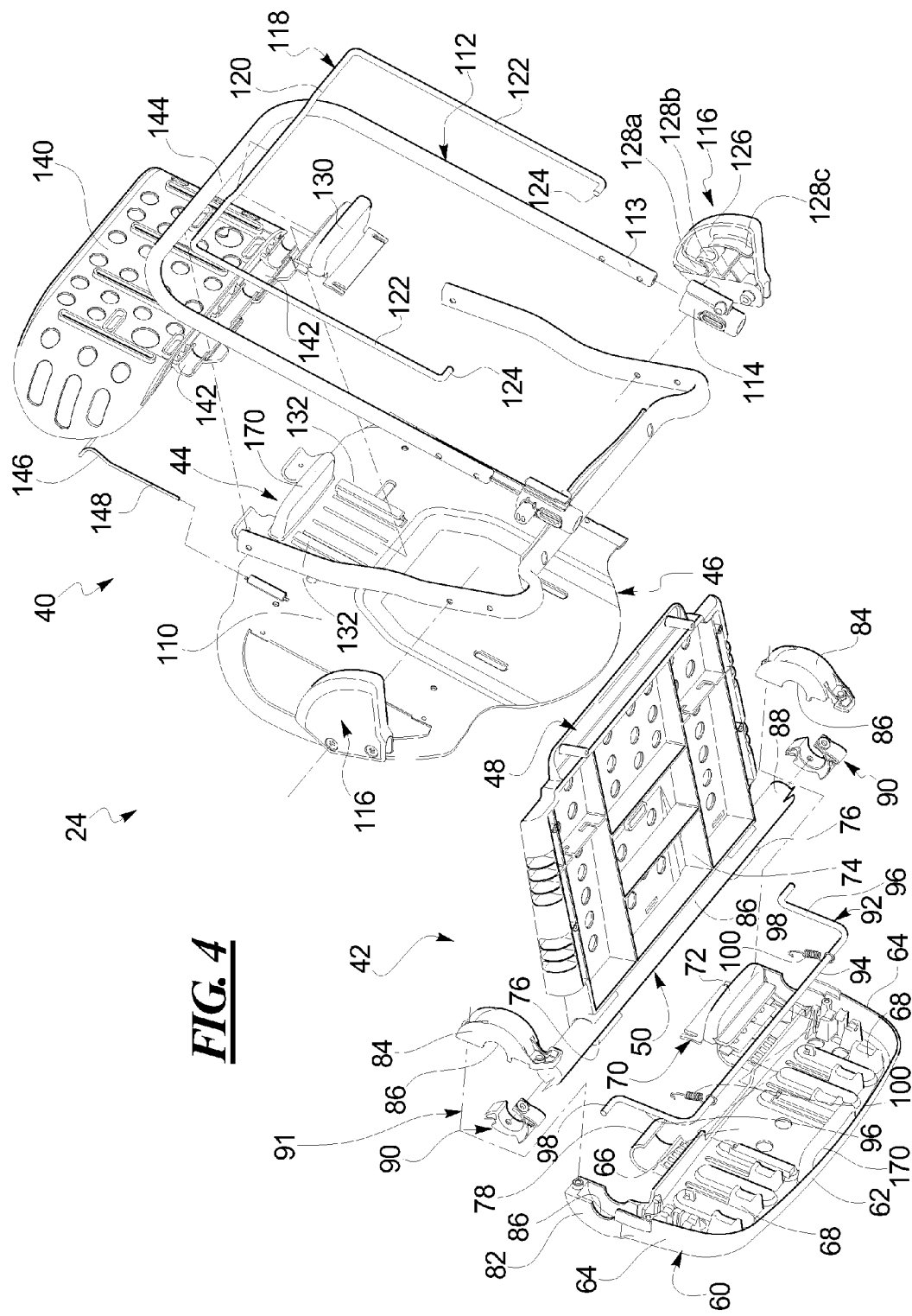
FIG. 4 shows an exploded view of the stroller seat of FIG. 3.

FIG. 4 shows an exploded view of the parts of the stroller seat 24 in this example. The seat bottom 42 is formed having a seat pan 74 that is also essentially a one-piece molded polymer or plastic component, similar to the calf support 60. The seat pan 74 would be covered by soft goods on the completed stroller 20. The forward end 50 of the seat bottom 42 has a pair of molded C-shaped hinge knuckles 76 that protrude from the forward end and are spaced apart along a width of the seat bottom. Likewise, the rear edge of the calf support 60 also has a pair of C-shaped hinge knuckles 78 protruding therefrom and spaced apart over the width of the calf support. The hinge knuckles 76 face in an opposite direction to the hinge knuckles 78. When the calf support 60 and the seat bottom 42 are assembled, the C-shaped hinge knuckles 76 and 78 align axially with one another and define a pivot axis for the calf support widthwise across the stroller seat 24.

A positioning mechanism housing 80 is provided at each side 64 of the calf support 60. Each housing 80 has a housing section 81 that is integrally molded on the calf support 60. Each housing section 81 has a hollow interior, is semi-circular in shape, and is open to the back side of the calf support 60. A housing cover 82 assembles over the open end of the housing section 81 when the calf support 60 is assembled. The housing section 81 and covers 82 can snap together when assembled, thus requiring no fasteners. In another example, housing 80 can be assembled using fasteners, if desired. Each housing cover 82 is similarly shaped in comparison to the corresponding housing section 81. When assembled, the housing section 81 and housing cover 82 on each side of the calf support 60 forms a hollow interior. Each housing 80 also has a through opening across the housing created by a half-moon cutout 84 on each housing section 81 and housing cover 82. A pivot tube or axle 86 extends widthwise across the stroller seat 44. The axle 86 is sized to be received between and captured by the opposed C-shaped knuckles 76, 78. The axle 86 is also sized to pass through the openings in the housings 80. Free ends 88 of the axle 86 protrude laterally outward from the sides of the calf support 60 as can be seen in FIG. 3, for example. The free ends 88 of the axle 86 can be received in or attached to parts of the frame assembly in order to assist in mounting the stroller seat 24 to the frame assembly.

A ratchet gear 90 is affixed near each end of the axle 86 and is disposed within a corresponding one of the housings 80 when the stroller seat 24 is assembled. Each ratchet gear 90 is secured so that it does not rotate during use. In one example, the ratchet gears 90 can be secured by fasteners to a portion of the respective housings 80 so that they remain stationary relative to a pivot axis of the calf support 60. The ratchet gears 90 and the axle 86 together form a positioning mechanism 91 for the calf support 60 in the disclosed example. Details of the ratchet gears 90 are described in greater detail below.

The grip portion 72 of the release actuator 70 is connected to a bent rod 92 of the release actuator. The bent rod 92 has a central portion 94 that extends in a widthwise direction part way across the calf support 60. The bent rod 92 also has a pair of generally vertical legs 96 that extend upward from the central portion 94 toward the ratchet gears 90 and the axle 86. An engagement pin 98 protrudes laterally outward from an upper end of each vertical leg 96 and in opposite directions from one another. As described below, the engagement pins 98 interact with the ratchet gears 90 during operation of the calf support 60. In this example, a pair of tension springs 100 is connected between the central portion 94 of the rod 92 and the panel 66 of the calf support 60. The tension springs 100 are arranged to bias the rod 92 in an upward direction so that the engagement pins 98 are biased toward and into engagement with the ratchet gears 90. The springs 100, bent rod 92, and release actuator 70 combine to form a release mechanism in this example. The release mechanism can be actuated, as needed, from an engaged position to a released position as discussed below.

The seat back 40 generally has a back panel 110, which can also be a molded polymer or plastic material. The seat back 40 also has a structural tube 112 that is an inverted U-shaped metal tubular structure in this example and to which the back panel 110 is attached. The structural tube 112 has lower free ends 113 that are connected to pivot stubs 114 carried on respective recline brackets 116 positioned at opposite sides of the seat back 40. A recline rod 118 is also mounted to the back panel 110 of the seat back 40. The recline rod 118 has a transverse central section 120, downward depending legs 122 at each end of the central section, and inward facing recline pins 124 at the lower ends of the legs. The recline pins 124 are each slidably captured in a respective slot 126 in a corresponding recline bracket 116. Each slot 126 has a plurality of positioning notches and 128a, 128b, 128c spaced apart along the slot.

A recline actuator 130 is connected to the central section 120 of the recline rod 118. The recline actuator 130 is captured on the back side of the back panel 110 and is vertically slidable between slide tracks 132 on the back panel. Thus, the recline rod 118 is also vertically movable in concert with the recline actuator 130. As with the bent rod 92, the recline rod 118 can also be spring biased in a downward direction, though the springs are not shown herein. Thus, the recline pins 124 can be biased to engage one of the positioning notches 128a, 128b, or 128c with which they are aligned. During operation, the user will actuate the recline actuator 130 in an upward direction, which will withdraw the recline pins 124 from one of the notches 128ab, b, or c and allow the recline pins to travel along the slots 126 in the recline brackets 116. The recline pins 124 will fire into a selected pair of the notches in the brackets 116 when the recline actuator 130 is released and the seat back 40 is in a selected reclined position. FIG. 1 depicts the seat back 40 in an intermediate reclined position, which would correspond with the notches 128b in the recline brackets 116 in this example. FIG. 1 also depicts the seat back 40 in phantom in an upright toddler seating position, which would correspond with the notches 128a.

FIG. 4 also depicts a head pan or head rest 140 that is pivotally coupled to a top end of the seat back 40. In this example, the head rest 140 can include C-shaped knuckles 142 coupled to a top bar 144 of the tube structure 112. A positioning wire 146 can be carried on the head rest 140. The positioning wire 146 can have engagement ends 148 on opposite sides of the wire that can engage channels 150 on the seat back panel 110 in an upright position (see FIG. 3). Bends formed in the engagement ends 148 can be configured and positioned to snap into place around the top bar 144 to assist in retaining and holding the head rest 140 in the first position and pivotally secured to the top bar. The positioning wire 146 can be configured to allow the engagement ends 148 to withdraw from the channels 150, and to pivot the head rest 140 forward from a first position, as shown, to a raised or second position discussed later. In the second position, the engagement end 148 of the wire can be configured, though not shown herein, to pass through holes in the back panel 110 to retain the head rest in the raised or second position.

Figure 5:
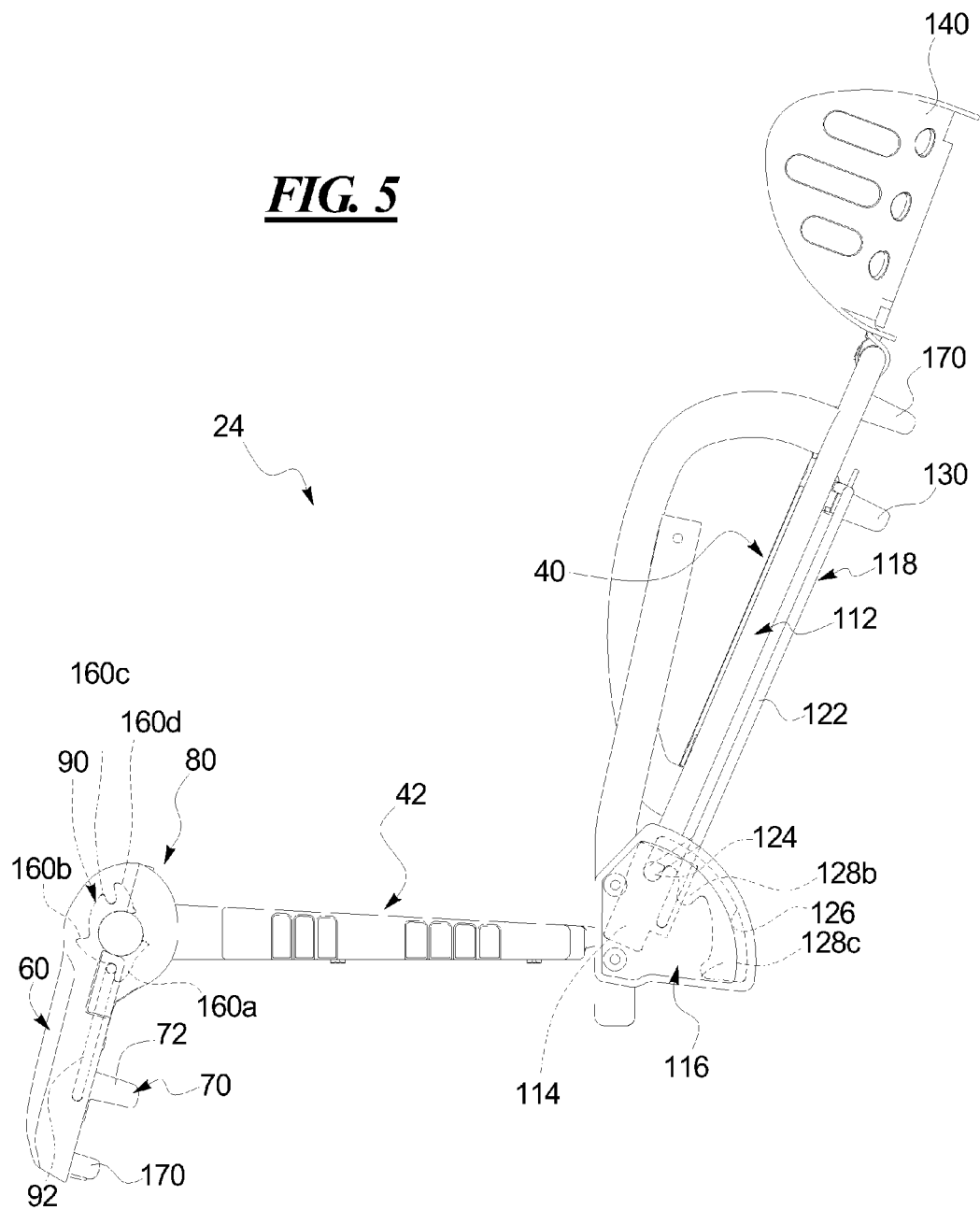
FIG. 5 shows a side view of the stroller seat shown in FIG. 2, with the seat back in an inclined position.
Figure 6:
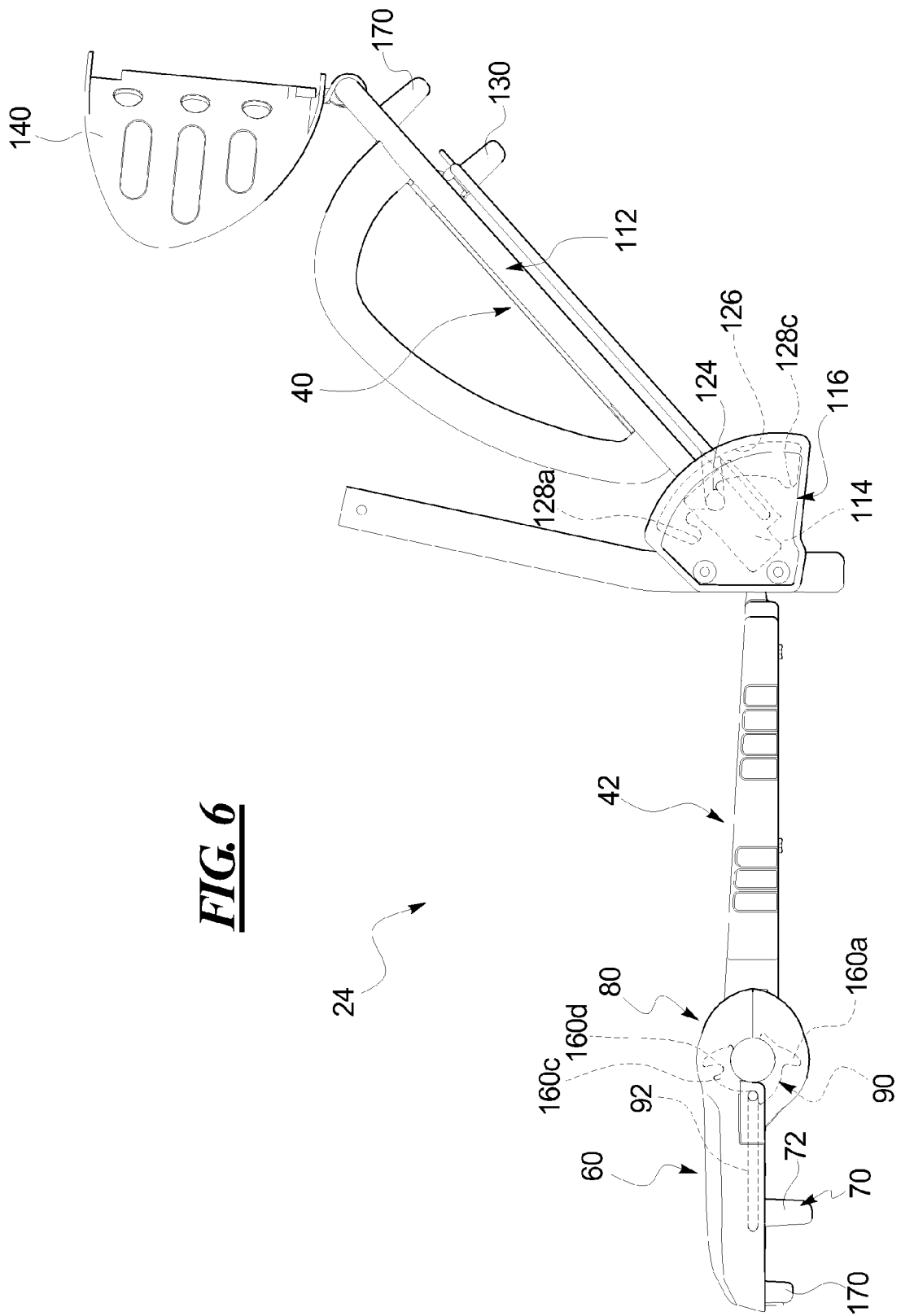
FIG. 6 shows the stroller seat shown in FIG. 5 but with the seat back in an intermediate reclined position.

With reference to FIGS. 1 and 5, the calf support 60 can be raised, pivoted, or lifted from the lowered position depicted therein to one or more selectable intermediate positions and/or to a raised position or uppermost position. In this example, the stroller seat 24 can be used in a toddler seating position, as depicted in these figures, whereby the calf support 60 is in the lowered position and the seat back 40 is in an upright toddler position. In one aspect according to the teachings of the disclosure, the calf support 60 can be raised from the lowered position independent of any motion of the seat back 40 and without actuating the release mechanism via the release actuator 70. The calf support 60 can be raised from the lowered position to an intermediate position as depicted in FIG. 6. In one example, this intermediate position can align the calf support 60 to be generally parallel with the seat bottom 42.

Also as depicted in FIGS. 1 and 6, the seat back 40 can be reclined independently from the upright toddler position to an intermediate reclined position by actuating the recline actuator 130 as discussed above. Also as depicted in FIG. 6, the head rest 140 can be pivoted from the first position whereby the head rest was generally parallel with the seat back 42 to a tilted forward/downward position as shown.

Figure 7:
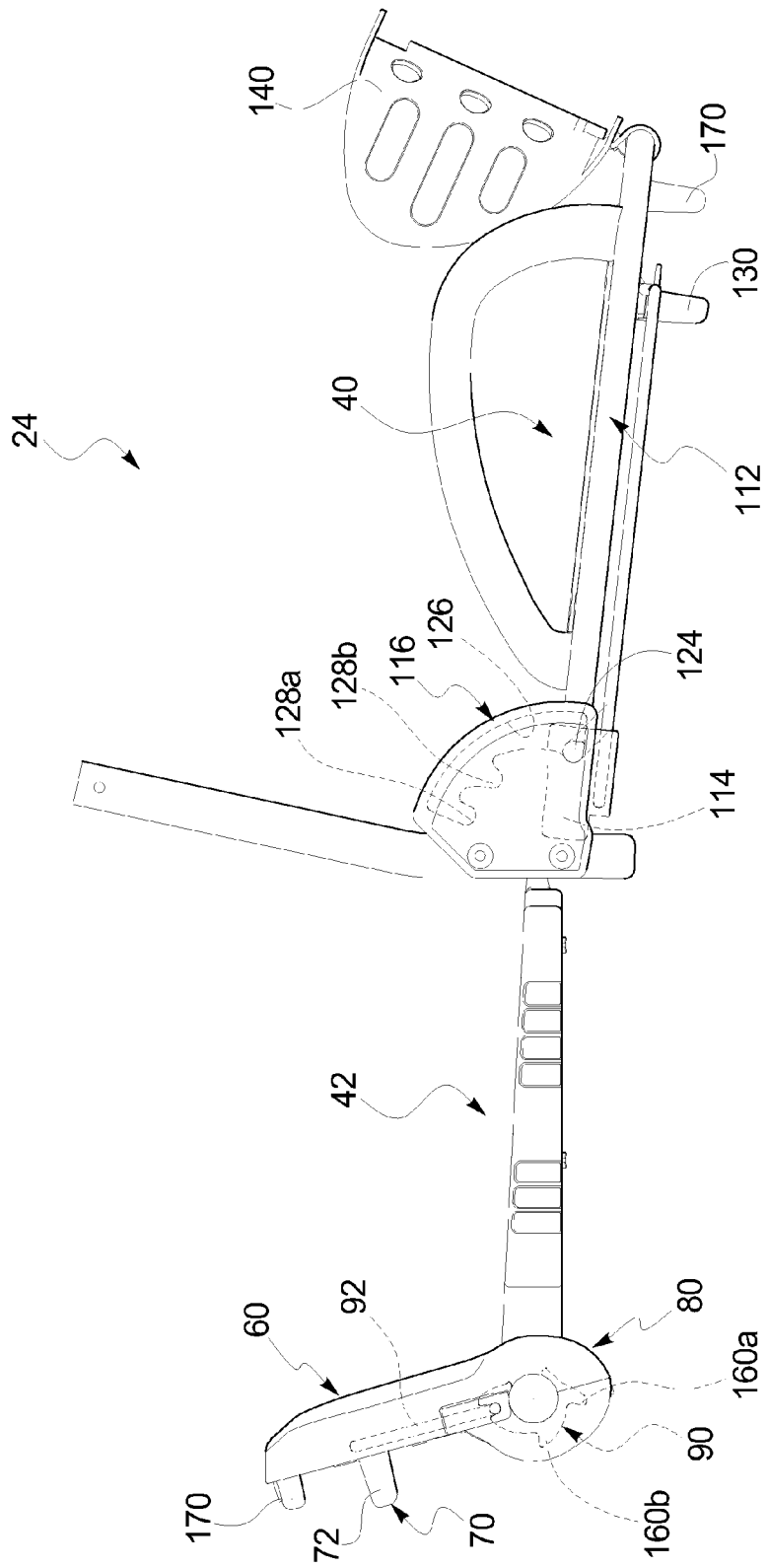
FIG. 7 shows the stroller seat shown in FIG. 5 but with the seat back in a completely reclined or lay flat position.

With reference to FIG. 7, the calf support 60 can be further raised in this example to another raised position or uppermost raised position whereby the calf support is generally vertical and generally or somewhat perpendicular to the seat bottom 42. Again, in this example the calf support 60 can be raised to this position without having to actuate the release mechanism via the release actuator 70. Also in this example, the seat back 40 can be independently lowered to a fully reclined or lie flat position as shown in FIG. 7. In this position, the recline pins 124 would engage the pair of recline notches 128c in the slots 126 on the brackets 116. Likewise, the head rest 140 can be further pivoted to a raised or 2nd position whereby the head rest is also generally vertical and generally or somewhat perpendicular to the seat back 40. In this lie flat fee position, the seat bottom 42 and the seat back 40 are somewhat or generally parallel to one another creating a generally flat sleeping surface for an infant. In this configuration, the stroller seat 24 can thus accommodate an infant lying on the seat. The raised calf support 60 and head rest 140 can help to create a barrier at each end of the stroller seat 24, similar to a carry cot or bassinet style sleeping device, so that the infant cannot easily slide from the stroller seat in a for or aft direction during use.

Figure 8:
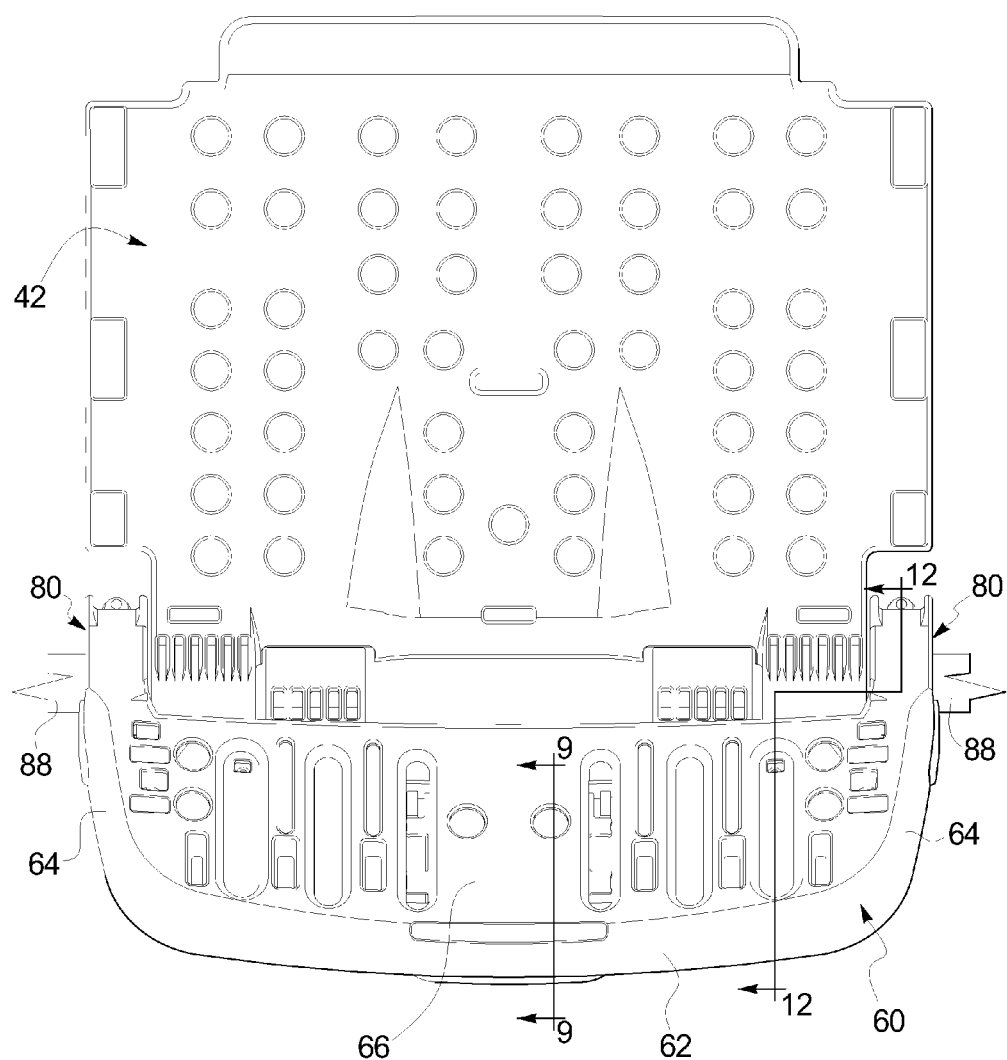
FIG. 8 shows a top view of the seat bottom and calf support of the stroller seat shown in FIG. 2.
Figure 9:
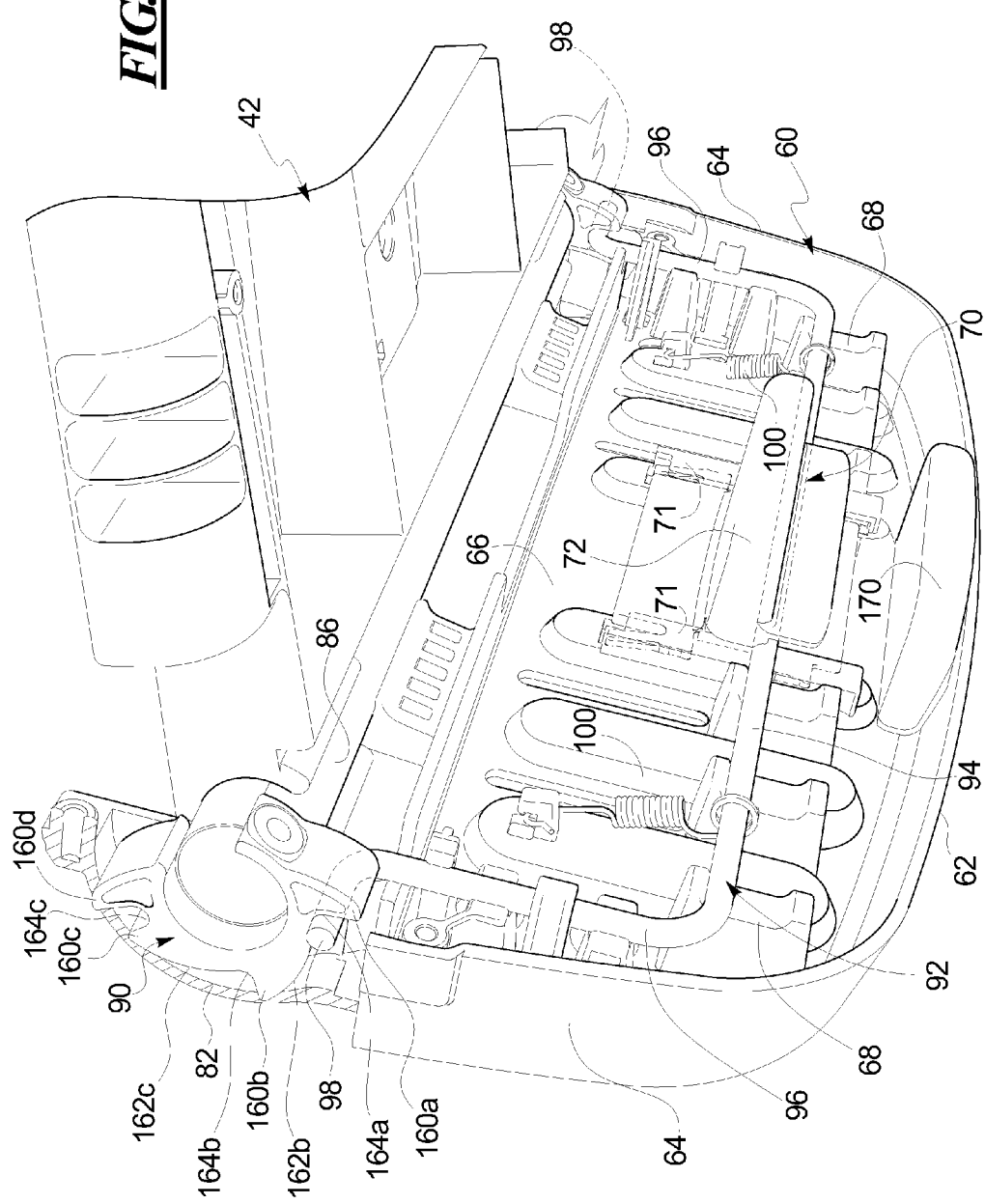
FIG. 9 shows a cross-section taken along line 9-9 of the stroller seat shown in FIG. 8 and with the calf support in a lowered position and a calf support release mechanism in a latched configuration.

FIG. 8 shows a top view of the seat bottom 42 and the calf support 60. Cross-sections are taken from this figure to help illustrate the construction and function of the positioning mechanism and the release mechanism. FIG. 9 shows one side of the positioning mechanism with the calf support 60 in the lowered position and with the release mechanism in the engaged position. As shown, each of the ratchet gears 90 has a perimeter edge that can carry a plurality of angled ratchet teeth 160a, 160b, 160c, and 160d. One side of the ratchet teeth 160b and 160c a ramped surface 162b and 162c corresponding to the respective tooth. The other side of the ratchet teeth 160a, 160b, and 160c each define a ratchet notch 164a, 164b, and 164c corresponding to the respective tooth. The lowermost tooth 160a has a height that acts as a travel stop for the calf support. The engagement pins 98 cannot travel far enough to clear the teeth 160a so that the calf support 60 cannot travel beyond the lowermost or lowered position. Thus, the one side of the tooth 160 does not have and does not require a ramped surface.

In this lowered position of the calf support, the engagement pins 98 are seated in the corresponding lower ratchet notches 164a on the respective ratchet gears 90. Though not shown herein, the engagement pins 98 would seat in the intermediate ratchet notches 164b with the calf support in the intermediate raised position depicted in FIG. 6. Likewise, the engagement pins 98 would seat in the upper ratchet notches 164c with the calf support in the uppermost or raised position depicted in FIG. 7.

Figure 10:
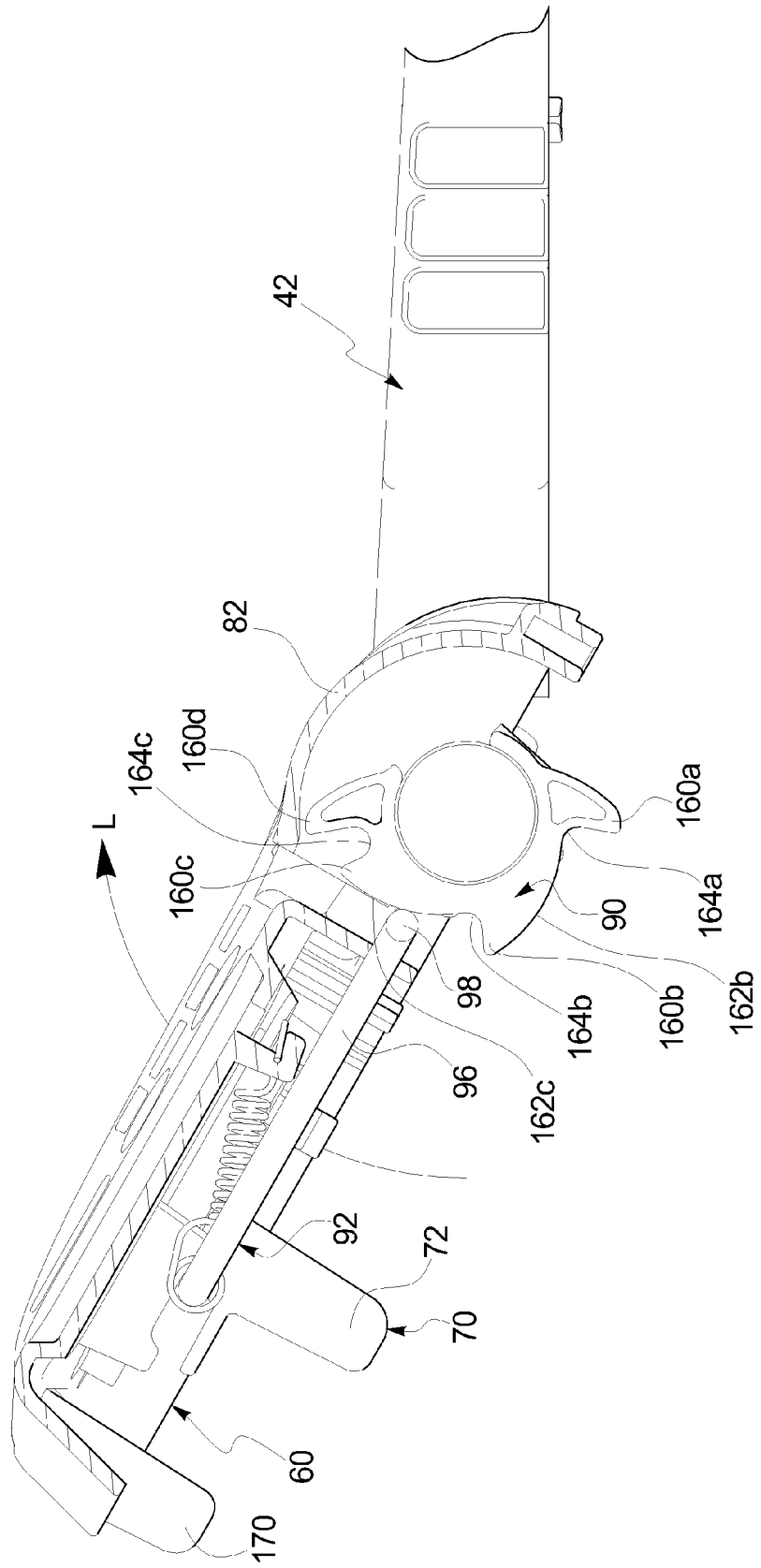
FIG. 10 shows a side view of the stroller seat shown in FIG. 9 but with the calf support in a partially raised position.

If a user wishes to raise the calf support 60 from the lowered position shown in FIGS. 5 and 9 to a different position such as those in FIG. 6 or 7, the user can simply lift and pivot the calf support about the pivot axis defined by the axle 86. The user can lift the calf support 60 in the direction of the arrow L as depicted in FIG. 10. By doing so, the engagement pins 98 will ride on the ramped surfaces 162b. This will force the engagement pins 98 outward away from the pivot axis and against the bias of the springs 100. As soon as the engagement pins 198 clear the ratchet teeth 160*b*, the engagement pins will fire into the intermediate ratchet notches 164*b* by force of the springs 100. Likewise, the user can further raise the calf support 60 to the uppermost or raised position without having to actuate the release actuator 70. The engagement pins 98 will again ride along the ramped surfaces 162*c* until they clear the ratchet teeth 160*c* and then will fire into the upper ratchet notches 164*c*. The upper ratchet notches 164*c* have a different configuration and do not coincide with any ramped surfaces and the uppermost teeth 164*d* have no ramped surfaces. Thus, the ratchet teeth 164*d* act as travel stops and prevent further rotational travel of the calf support 60 beyond the uppermost or raised position. Again, the ratchet teeth 164*d* can have a height sufficient to prevent the engagement pins from clearing the teeth.

Figure 11:
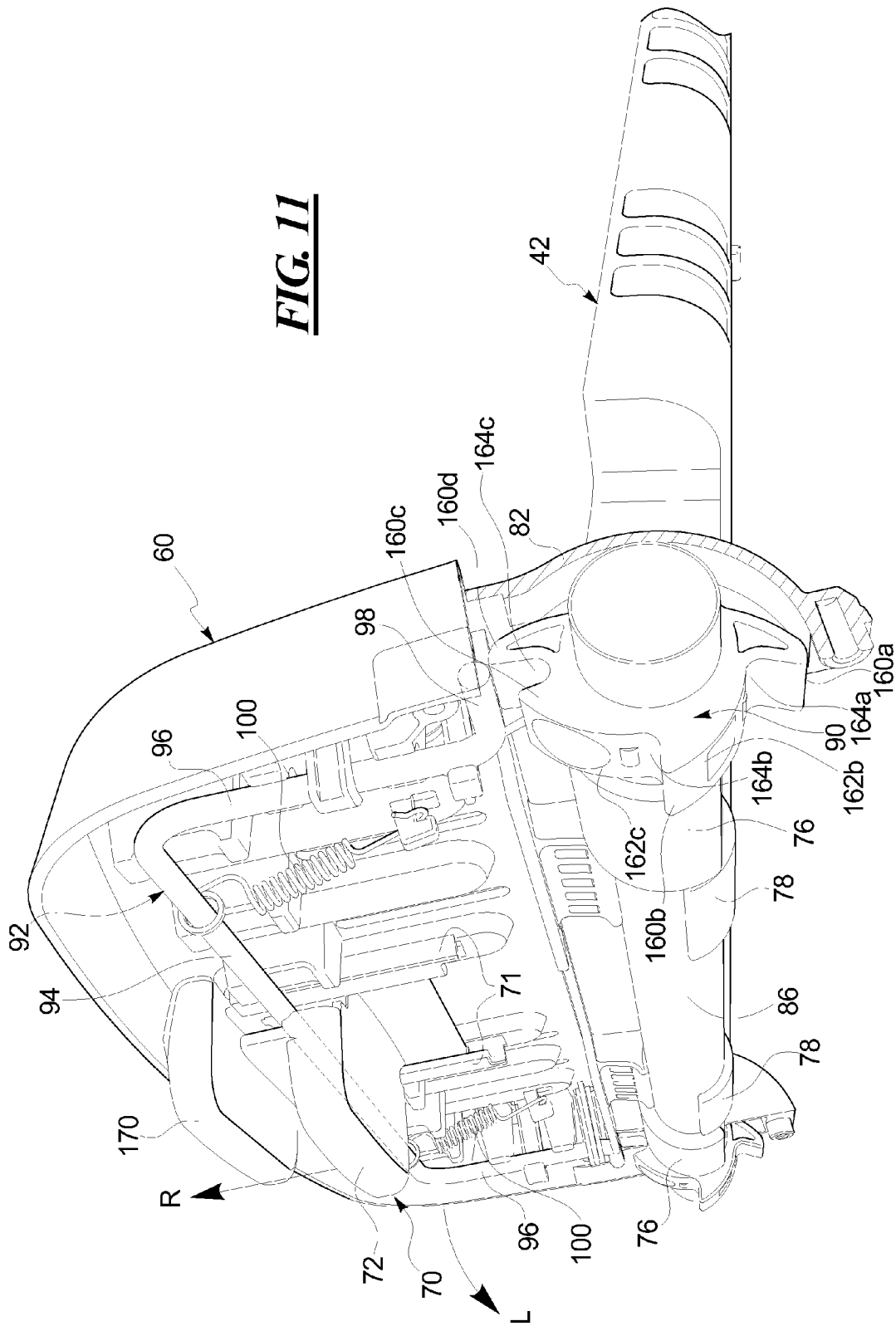
FIG. 11 shows the stroller seat shown in FIG. 9, but with the calf support in a fully raised position and the calf support latch mechanism in a released configuration.

With the calf support 60 in any selectable and raised position, and the engagement pins 98 seated in any of the ratchet notches 164*b* or 164*c* that correspond to a selectable and raised position, the user must actuate the release mechanism in order to lower the calf support. As depicted in FIG. 11, the user can actuate the release mechanism by squeezing the release actuator 70 in the direction of the arrow R. Thus, the release actuator 70 can be configured to take on the form of a trigger that is slidable or movable along the back side or another surface of the calf support 60. Also, the calf support 60 can be provided with a leverage device or landing 170 so that the user has something against which to squeeze the actuator. By moving the release actuator 70 from the engaged position of FIG. 9 to the release position depicted in FIG. 11, the engagement pins 98 are disengaged from the ratchet notches and can clear either of the ratchet teeth 160*b* or 160*c*. With the release mechanism in the released position, the calf support is free to move in either direction, and particularly is free to be lowered to a desired new position.

The seat back 40 can also be provided with a leverage device or landing 170. The landing 170 can be used in order to squeeze the recline actuator 130 in the same manner in order to actuate the recline mechanism.

Figure 12:
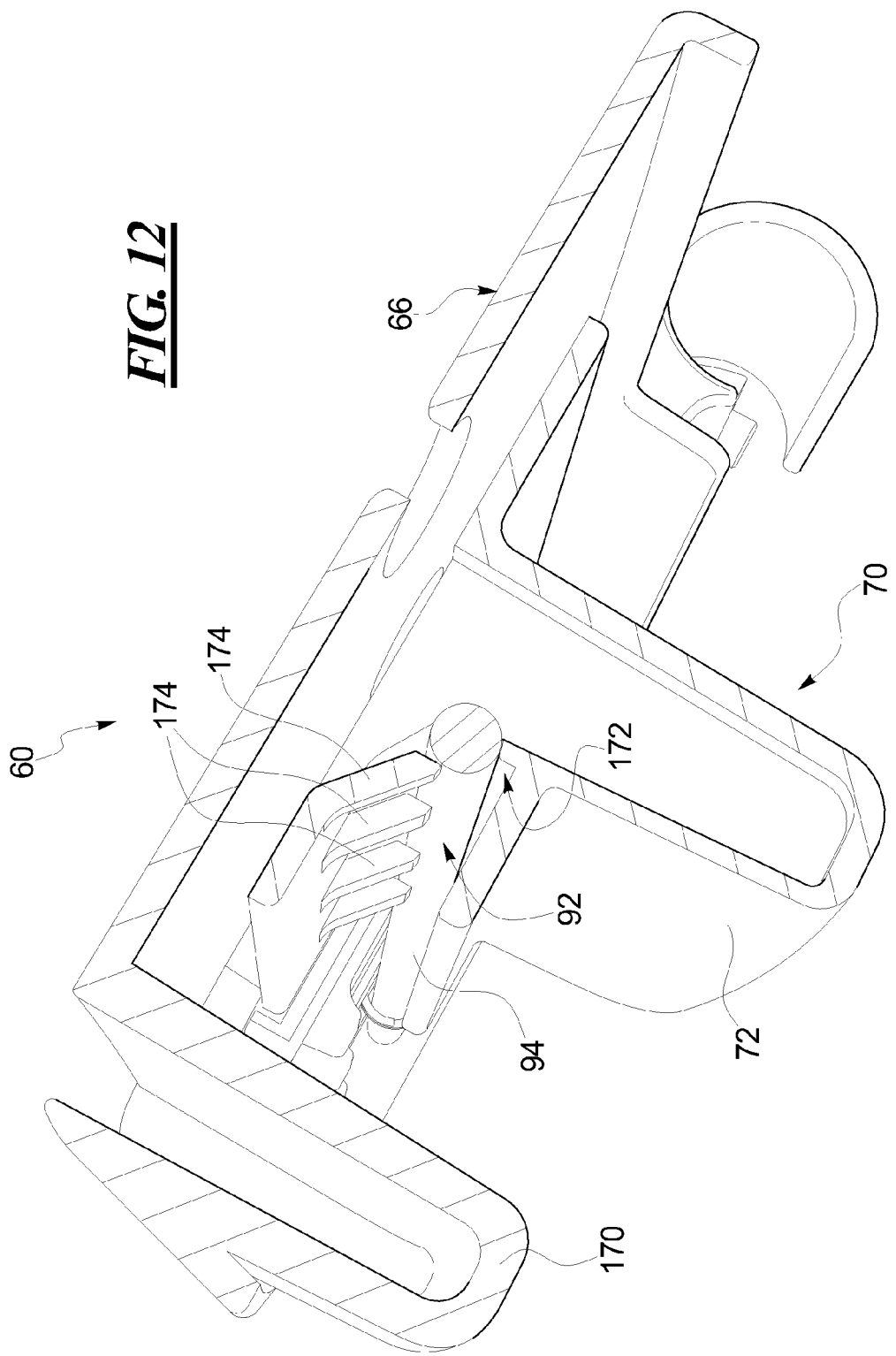
FIG. 12 shows a cross-section taken along line 12-12 of FIG. 8 showing a portion of the release mechanism of the calf support.

In another aspect according to the teachings of the present disclosure, many of the components disclosed herein are configured to snap together without the need for or use of any fasteners. For example, the earlier described knuckles and positioning mechanism housings can snap together without the need for any fasteners. The release actuator 70 can also be configured in such a manner. As shown in FIG. 12, the release actuator 70 can incorporate an insertion slot or channel 172. A plurality of one-way flex fingers 174 can be positioned adjacent the entry to the channel 172. The flex fingers 174 can be oriented so that the central portion 94 of the bent rod 92 can be forcibly pushed past the flex fingers and into the channel. The flex fingers 174 will then spring back to their natural position and prevent removal of the central portion 94 without breaking the flex fingers. Though not shown or described herein, the recline actuator 130 can have a similar or identical construction for attaching the recline actuator to the central section 120 of the recline rod 118.

Figure 13:
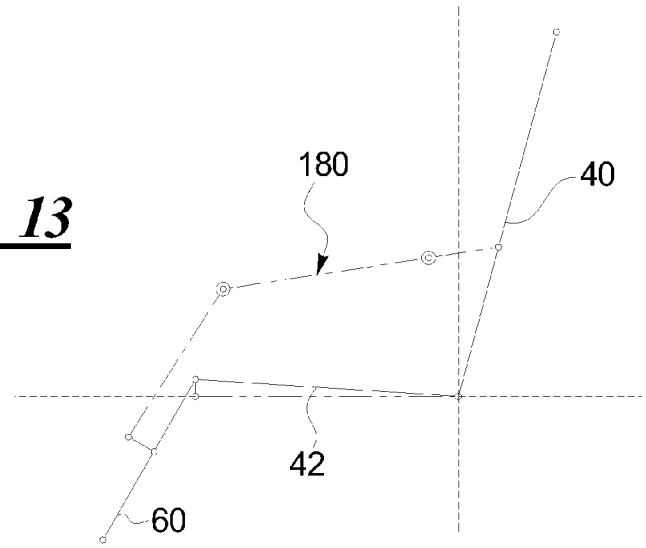
FIG. 13 shows a simplified schematic view of another example of a stroller seat constructed in accordance with the teachings of the present disclosure and with the seat back in an inclined position.
Figure 14:
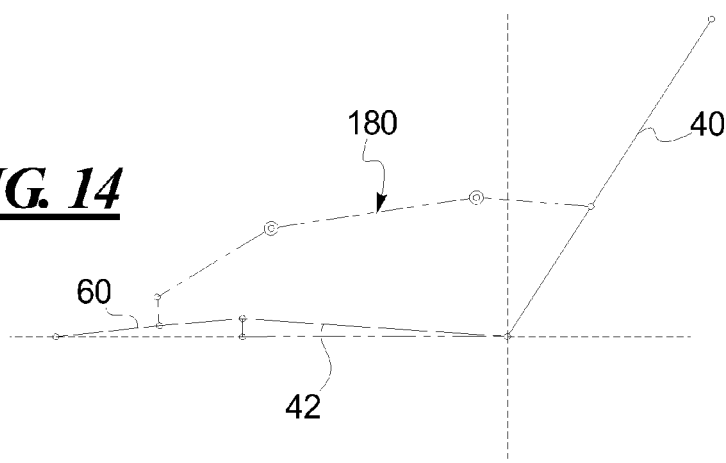
FIG. 14 shows the stroller seat shown in FIG. 13 but with the seat back in an intermediate reclined position and the calf support in a partially raised position.
Figure 15:
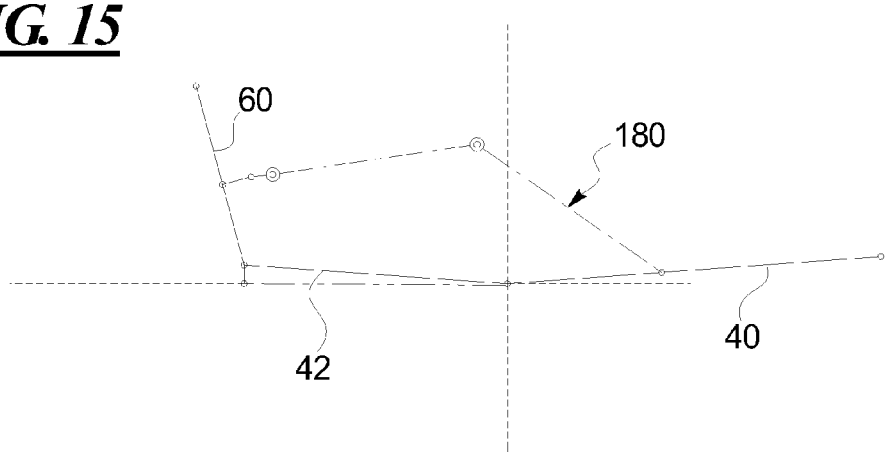
FIG. 15 shows the stroller seat shown in FIG. 13 but with the seat back in a fully reclined or lie flat position and the calf support in a completely raised position.

In another aspect according to the teachings of the present invention, the stroller seat 24 can be configured so that movement of the calf support 60, at least in the lowered to raised direction, is dependent upon and automatically achieved by movement of the seat back 40 from the upright toddler position to a lowered or reclined position. In one example, the seat back 40 can be linked to the calf support 60 on one or both of the left and right frame sides. The components can be linked by a mechanical linkage system with various rigid links and pivot points, by one or more one-way or push-pull wires or cable components, or the like. FIGS. 13-15 illustrate one generic example of the stroller seat 24 with such an arrangement.

As shown therein, the seat back 40 is linked to the calf support 60 by a linkage system 180. FIG. 13 shows the seat back 40 in the upright toddler position and the calf support 60 in the lowered position. A user can release the seat back 40 by actuating the release actuator 130 and reclining the seat back a described earlier. This will automatically begin to raise the calf support 60, which in the disclosed example, does not require actuation of the release mechanism via the release actuator 70. FIG. 14 shows the seat back 40 in an intermediate reclined position and the calf support 60 in an intermediate raised position. FIG. 15 shows the seat back 40 in the fully reclined or lie flat infant position and the calf support 60 in the raised position. In such an example, the calf support 60 may be equipped without any release mechanism and strictly rely on movement of the seat back 40 to raise and lower the calf support. In another example, the calf support 60 may still be equipped with a release mechanism, such as the example disclosed and described herein.

The linkage system 180, whether a rigid pivoting link arrangement, a cable arrangement, a wire arrangement, or the like, can be integrated into the frame assembly 22 in a manner that hides or covers the compliments. In one example, the linkage system 180 can be a push-pull cable system whereby the cables are routed as much as possible within frame tubes of the frame assembly 22.

The disclosed stroller seat 24 has a calf support that can be articulated among a plurality of different positions or configurations, and particularly to accommodate different seat back positions. The calf support can be in a down, calf supporting configuration or position when the seat back is upright so that a seat occupant sits upright in the seat with their calves supported while their legs dangle forward of the edge of the seat bottom. The calf support can be in a partially raised position to support a seat occupant's legs horizontally forward of the seat bottom. The calf support can also be in a raised position to create a barrier or wall at the front edge of the seat bottom with the seat back in a lie flat or bassinet configuration.

The components of the stroller seat 24 and the calf support 60 can be designed to have a snap together, easy to assemble configuration. The parts can also be configured to require few moving parts and require no separate fasteners to assemble. The trigger or actuator can be assembled to the calf support by pushing the trigger into slots or tracks on the calf support. Again, molded-in flex fingers on a base of the trigger can snap connect the trigger to the calf support, also for a permanent one-time installation or assembly. Again, no fasteners are necessary. The gear covers or housings can be design to snap connect to the pivot joint or axle of the calf support. In another example, the calf support can be configured to pivot automatically as the seat back is inclined or reclined, both moving in concert with one another. The calf support can have a cable with one end attached to it. The other end of the cable can be attached to the seat back at a pre-determined location. As the seat back is reclined, the cable "pulls" the calf support up to an upright position that directly corresponds to a specific seat back angle.

The cable attachment points can, in one optional example be adjustable to alter the movement characteristics of the calf support relative to movement of the seat back. In one example, a cable can be contained within the seat and/or frame components to ensure safety and conceal the cables. The attachment location on the seat back may be adjustable so the user can adjust the calf support movement as the seat back is reclined. With the cable attached to the seat back in an uppermost adjustment position, the calf support would rotate up vertically to help create a bassinet when the seat back is completely reclined. With the cable attached to the seat back in a lowest adjustment position the calf support would not rotate as the seat back is reclined. Thus, the calf support would remain in the position the user last left it in. With the cable attached to the seat back in a middle adjustment position, the calf support would rotate up horizontally to when the seat back is completely reclined. Moreover, the user could adjust the cable attachment location to the seat back to any location between the uppermost and lowest positions, if desired, to help control the final calf support position as the backrest is reclined.

The disclosed stroller seat provides an effortless and inexpensive way to manually or automatically deploy and reposition the calf support in order to form part of a child retention wall with the stroller seat in a bassinet or lay flat configuration. The articulation of the calf support is accomplished with minimal additional components or parts and with only simple assembly required. Further, the calf support in one example can automatically return to the lowered position depending from the front edge of the seat bottom when the seat back is moved from the lie flat configuration to an upright configuration.

In the disclosed example, the stroller seat can have removable soft goods placed over a generally rigid supporting structure that defines and shapes at least part of the seat assembly, such as the seat bottom pan, the seat back panel, and the calf support panel. As will be evident to those having ordinary skill in the art, the configuration and construction of the stroller seat can vary considerably and yet fall within the spirit and scope of the present invention.

The seat back pivotally connects to the seat bottom and the top end of the seat back can connect to a head pan, as noted above. The head pan can also be constructed to automatically articulate from a position parallel to the seat back when the seat back is upright, to a position normal to or perpendicular to the seat back when the seat back is fully reclined or in a lie flat orientation.

It should be appreciated that the disclosed examples illustrated and described above are just two possible embodiments. Other embodiments may certainly fall within the spirit and scope of the invention. One skilled in the art will appreciate that the calf support articulation mechanisms and components could assume any number of alternative configurations that allowing the operator to rotate and cause the calf support to move between the raised and lowered positions to accommodate movement of, or to move in unison with, the recline position of the seat back. The number of calf support and/or seat back positions can be carried from the three positions disclosed herein to include only two positions or more than three positions. Thus, the number and spacing of the ratchet teeth can also define multiple intermediate calf support positions between the raised position and lowered position defined by the location of the stop teeth. The calf support can be pivoted to any desired position within the range of the stop teeth by as little as one tooth width.

Although certain stroller seat, calf support, and seat back components, structures, features, and methods have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller seat comprising:
a seat bottom having a forward end and a rear end;
a calf support pivotally connected to the seat bottom about a pivot axis adjacent the forward end and pivotable between a lowered position and a raised position relative to the seat bottom;
a positioning mechanism coupled to the calf support and reconfigurable between an engaged arrangement and a released arrangement, the positioning mechanism configured, when in the engaged arrangement, to retain the calf support in a selected position selectable from among at least the lowered position and the raised position; and
a release actuator on the calf support, the release actuator including a rod extending in a widthwise direction relative to the calf support and having a portion arranged to selectively engage the positioning mechanism in the engaged arrangement, the release actuator configured to move the rod parallel to the widthwise direction of the calf support and relative to the positioning mechanism to disengage the portion of the rod from the positioning mechanism in the released arrangement,
wherein the positioning mechanism is configured, whether in the engaged arrangement or the released arrangement, to allow the calf support to move from the lowered position to the raised position, and wherein the positioning mechanism is configured, when in the engaged arrangement, to prevent the calf support being moved from the raised position to the lowered position and, when in the released arrangement, to permit the calf support to move from the raised position to the lowered position.

2. A stroller seat according to claim 1, wherein the release actuator is positioned near the widthwise center of the calf support.

3. A stroller seat according to claim 1, wherein the release actuator is positioned on a back side of the calf support.

4. A stroller seat according to claim 1, wherein the calf support has first and second opposed sides and has first and second positioning mechanisms, one at each of the first and second sides of the calf support.

5. A stroller seat according to claim 4, wherein the release actuator is positioned near the widthwise center of the calf support and, when actuated, reconfigures the first and second positioning mechanisms to the released arrangement.

6. A stroller seat according to claim 1, wherein the release actuator is a trigger positioned near a widthwise center of the calf support, the trigger being slidable or squeezable, when actuated, from an engaged position to a released position.

7. A stroller seat according to claim 6, wherein the trigger is spring biased toward the engaged position.

8. A stroller seat according to claim 6, wherein the calf support has a free edge opposite the forward end of the seat bottom, and wherein the trigger is actuated by drawing the trigger toward the free edge.

9. A stroller seat according to claim 1, wherein the positioning mechanism includes a fixed ratchet gear mounted on the pivot axis, the fixed ratchet gear having a first angled tooth forming a first ratchet notch in an edge of the fixed ratchet gear and positioned to correspond to the lowered position and a second angled tooth forming a second ratchet notch in the edge of the fixed ratchet gear and positioned to correspond to the raised position.

10. A stroller seat according to claim 9, wherein the portion of the rod of the release actuator is an engagement pin that is spring biased toward the edge of the fixed ratchet gear and seats in any of the first and second ratchet notches when aligned therewith.

11. A stroller seat according to claim 10, wherein the release actuator withdraws the engagement pin away from the edge of the fixed ratchet gear when the release actuator is actuated.

12. A stroller seat according to claim 1, wherein the calf support further comprises:
   first and second opposed sides, the release actuator positioned widthwise centrally between the first and second sides on the calf support;
   first and second positioning mechanisms, one at each of the first and second sides of the calf support; and
   an axle extending between the first and second sides and coupled to the first and second positioning mechanisms.

13. A stroller according to claim 12, wherein the first and second positioning mechanisms each includes a fixed ratchet gear mounted to a corresponding end of the axle.

14. A stroller according to claim 13, wherein each of the fixed ratchet gears has a lower angled tooth forming a lower ratchet notch in an edge of the fixed ratchet gear and positioned to correspond to the lowered position and an upper angled tooth forming an upper ratchet notch in the edge of the fixed ratchet gear and positioned to correspond to the raised position.

15. A stroller seat according to claim 14, wherein the rod of the release actuator extends widthwise across the calf support and the portion of the rod is an engagement pin near each terminal end of the rod, the rod being spring biased such that the pins are biased toward the edges of the respective fixed ratchet gears and seat in any of the lower or upper ratchet notches when aligned therewith.

16. A stroller seat according to claim 15, wherein the release actuator withdraws the engagement pins away from the edges of the respective fixed ratchet gears when the release actuator is actuated.

17. A stroller seat according to claim 1, wherein the calf support can be retained in one or more selectable intermediate positions between the raised position and the lowered position with the positioning mechanism in the engaged arrangement.

18. A stroller seat according to claim 1, further comprising a seat back wherein the seat back can be reclined to a lie flat seat orientation that is generally horizontal and generally parallel with the seat bottom, and wherein the calf support, in the raised position, is oriented generally vertically and generally perpendicular to the seat bottom in the lie flat seat orientation.

19. A stroller seat according to claim 18, wherein the seat back has an upper free end and a head rest pivotally coupled to the upper free end, and wherein the head rest can be pivoted to a raised position generally vertical and generally perpendicular to the seat back in the lie flat seat orientation.

20. A stroller seat according to claim 18, wherein the calf support is moved automatically from the lowered position to the raised position when the seat back is moved to the lie flat seat orientation.

* * * * *